(12) United States Patent
Ulbrich et al.

(10) Patent No.: US 9,112,410 B2
(45) Date of Patent: Aug. 18, 2015

(54) APPARATUSES AND SYSTEM HAVING SEPARATE POWER CONTROL AND TIMING CONTROL OF A POWER CONTROL SYSTEM AND RELATED METHOD

(75) Inventors: Stephen Ulbrich, Anaheim Hills, CA (US); Jack Cornish, Foothill Ranch, CA (US); Kenneth Kwok, Irvine, CA (US); Jan Krellner, Laguna Niguel, CA (US)

(73) Assignee: INTEGRATED DEVICE TECHNOLOGY, inc., San Jose, CA (US)

( * ) Notice: Subject to any disclaimer, the term of this patent is extended or adjusted under 35 U.S.C. 154(b) by 97 days.

(21) Appl. No.: 13/441,747

(22) Filed: Apr. 6, 2012

(65) Prior Publication Data

US 2013/0265022 A1 Oct. 10, 2013

(51) Int. Cl.
*H02M 3/158* (2006.01)

(52) U.S. Cl.
CPC .................................. *H02M 3/1584* (2013.01)

(58) Field of Classification Search
CPC .............................. H02M 3/156; H02M 3/158
USPC .......................... 323/271, 272, 282, 285, 909
See application file for complete search history.

(56) References Cited

U.S. PATENT DOCUMENTS

| | | | |
|---|---|---|---|
| 5,353,215 A | 10/1994 | Dinwiddie et al. | |
| 6,563,294 B2 * | 5/2003 | Duffy et al. | 323/283 |
| 6,788,035 B2 * | 9/2004 | Bassett et al. | 323/272 |
| 6,806,689 B2 * | 10/2004 | Schuellein et al. | 323/272 |
| 7,224,592 B2 | 5/2007 | Chou et al. | |
| 7,301,314 B2 | 11/2007 | Schuellein et al. | |
| 7,342,383 B1 | 3/2008 | Song et al. | |
| 7,453,251 B1 * | 11/2008 | Mehas et al. | 323/299 |
| 7,456,617 B2 * | 11/2008 | Chapuis et al. | 323/267 |
| 7,518,894 B2 | 4/2009 | Fosler et al. | |
| 7,793,005 B1 | 9/2010 | Fernald et al. | |
| 8,330,439 B2 * | 12/2012 | Wu | 323/272 |

(Continued)

FOREIGN PATENT DOCUMENTS

KR 10-0881500 2/2009

OTHER PUBLICATIONS

Linear Technology, "LTC3731 3-Phase, 600 kHz, Synchronous Buck Switching Regulator Controller," data sheet, 2003, pp. 1-32, Linear Technology Corporation, Milpitas, California.

(Continued)

*Primary Examiner* — Gary L Laxton
*Assistant Examiner* — Kyle J Moody
(74) *Attorney, Agent, or Firm* — TraskBritt P.C.

(57) ABSTRACT

Power control systems and power control devices may include a power control chip having a power control module configured to generate a power stage control signal, and at least one power stage having a timing control module that is physically separate from the power control module. The timing control module may be configured to receive the power stage control signal and generate a timing control signal controlling at least one switch to regulate an output voltage of the at least one power stage. A related method may include generating power stage control information indicating an offset between an output voltage and a desired regulated output voltage, transmitting the power stage control information between modules that are physically separate, and timing signals for controlling a switching converter to regulate the output voltage. A related method of auto-configuring a power control system is also disclosed.

26 Claims, 4 Drawing Sheets

(56) References Cited

U.S. PATENT DOCUMENTS

| | | | |
|---|---|---|---|
| 8,467,157 B2* | 6/2013 | Gaknoki et al. | 361/18 |
| 8,737,552 B1* | 5/2014 | Sawyer | 375/359 |
| 2004/0041543 A1* | 3/2004 | Brooks et al. | 323/212 |
| 2004/0136208 A1 | 7/2004 | Agarwal et al. | |
| 2005/0073288 A1 | 4/2005 | Harris | |
| 2006/0052905 A1 | 3/2006 | Pfingsten et al. | |
| 2006/0244570 A1 | 11/2006 | Leung et al. | |
| 2006/0279969 A1 | 12/2006 | Leung et al. | |
| 2007/0030716 A1 | 2/2007 | Manolescu | |
| 2008/0218155 A1 | 9/2008 | Huang et al. | |
| 2009/0153110 A1 | 6/2009 | Huang | |
| 2010/0001705 A1* | 1/2010 | Takahashi | 323/283 |
| 2010/0225287 A1* | 9/2010 | Schultz | 323/272 |
| 2010/0231183 A1 | 9/2010 | Jan et al. | |
| 2011/0198926 A1 | 8/2011 | Xu et al. | |
| 2011/0283130 A1 | 11/2011 | Pai et al. | |
| 2013/0057239 A1 | 3/2013 | Kalje et al. | |
| 2013/0278234 A1 | 10/2013 | Krellner Jan et al. | |

OTHER PUBLICATIONS

Intersil, "ISL6336, ISL6336A, 6-Phase PWM Controller with Light Load Efficiency Enhancement and Current Monitoring," data sheet, Intersil Americas, Inc., May 28, 2009, pp. 1-31.

Intersil, "ISL6617, PWM Doubler with Phase Shedding Function and Output Monitoring Feature," data sheet, Intersil Americas, Inc., Feb. 4, 2010, pp. 1-15.

PCT International Search Report and Written Opinion of the International Searching Authority for PCT/US2013/035248, dated Jul. 25, 2013, 13 pages.

PCT International Search Report and Written Opinion of the International Searching Authority for PCT/US2013/036893, dated Jul. 12, 2013, 8 pages.

* cited by examiner

APPARATUSES AND SYSTEM HAVING SEPARATE POWER CONTROL AND TIMING CONTROL OF A POWER CONTROL SYSTEM AND RELATED METHOD

FIELD

Embodiments of the present disclosure relate generally to power control systems and, more particularly, to apparatuses, systems and related methods for having separate power control and timing control of a power control system.

BACKGROUND

Power control systems regulate voltages that are often used to provide power to devices, systems, and sub-systems of a variety of electronic systems. FIG. 1 is a schematic diagram of a conventional power control system 100. The power control system 100 includes a pulse-width-modulation (PWM) controller 110 operably coupled with one or more switching converter 120 to operate as a switching regulator. As shown in FIG. 1, the switching converter 120 may include one or more circuit elements to regulate a voltage and generate an output voltage ($V_{OUT}$) 105. For example, the top right switching converter 120 is shown to include a plurality of transistors (M1, M2) operably coupled with a diode (D1), an inductor (L1) and a capacitor (Cout) in a buck configuration. The other switching converters 120 of the plurality may include circuit elements that are similarly configured, and which are shown to have similar designations. For simplicity, the operation of the PWM controllers 110 will be described only with respect to the top right switching converter 120; however, the other switching converters 120 may have a similar operation.

The PWM controller 110 includes a power control module 112 and a timing control module 114 that are conventionally co-located together. "Co-location" of the power control module 112 and the timing control module 114 means that the power control module 112 and the timing control module 114 are physically located on the same semiconductor die and/or within the same package. For example, the power control module 112 and the timing control module 114 may be formed on different semiconductor dice, yet still may be defined as being co-located if housed within the same package. As a result, at least some of the interconnections between the power control module 112 and the timing control module 114 may be internal connections within the package.

The power control module 112 may be configured to perform the voltage regulation loop function of the power control system 100. For example, the PWM controller 110 may have a pin (labeled as pin "5") that receives an output voltage 105 of the power control system 100 as a feedback signal. The PWM controller 110 may include another pin (labeled as pin "6") that receives a ground voltage 106. The voltage difference between the output voltage 105 and the ground voltage 106 is understood by the PWM controller 110 to be the regulated voltage coupled to a load (not shown). The output voltage 105 and the ground voltage 106 may be input into the PWM controller 110 to a unity-gain differential amplifier (not shown) configured for remote sensing of the positive and negative load terminals. The output (DIFFOUT) from the internal differential amplifier may be an output voltage feedback signal that is output from pin "7" to a voltage divider. From the voltage divider, a portion of the DIFFOUT signal may be input into pin "8" of the PWM controller 110. The input signal (EAIN) through pin 8 may be input to an internal comparator (not shown) of the PWM controller 110 for comparison to an internal reference voltage.

The result of the comparison of the EAIN signal and the internal reference voltage may be transmitted to the timing control module 114, which is configured to determine the duty cycle timing for the switching converter 120. In particular, the PWM controller 110 generates timing signals (PWM signals) that are output from the PWM controller 110 through pins "33" and "27." The timing signals drive the gates of transistors (M1, M2) at the proper duty cycle to regulate the output voltage 105 to the desired voltage. The PWM controller 110 may further include current sense feedback signals ($S1^+$, $S1^-$) that monitor the current flowing through the inductor (L1) to further control the output current. These current sense feedback signals may be input to the timing control module 114 such that the timing control module 114 generates the timing signals to have a duty cycle based largely on the result of the comparison of the EAIN signal and the internal reference signal, as well as the current sense feedback signals.

BRIEF SUMMARY

Embodiments of the present disclosure may include a power control device. The power control device comprises a power control module configured to generate a power stage control signal indicating an offset between an output voltage and a reference voltage. The power control module is further configured to externally transmit the power stage control signal to an external power stage having a timing control module that is physically separate from the power control module.

Embodiments of the present disclosure may include a power control device. The power control device may comprise a timing control module configured to receive a power stage control signal from a power stage control module that is physically separate from the timing control module. The timing control module may be further configured to generate a timing control signal that control the duty cycle for a voltage converter responsive to the power stage control signal.

Embodiments of the present disclosure may include a power control system. The power control system may comprise a power control chip having a power control module configured to generate a power stage control signal, and at least one power stage having a timing control module that is not co-located with the power control module. The timing control module is configured to receive the power stage control signal and generate a timing control signal controlling at least one switch to regulate an output voltage of the at least one power stage.

Embodiments of the present disclosure may include a method of controlling power of a power control system. The method may comprise generating, in a first module, power stage control information indicating an offset between an output voltage and a desired regulated output voltage, transmitting the power stage control information to a second module that is physically separate from the first module, and generating, in the second module, timing signals for controlling a switching converter to regulate the output voltage.

Embodiments of the present disclosure may include a method of auto-configuring a power control system. The method may comprise communicating auto-configuration information between at least one power stage having a power control module and a timing control chip having a timing control module that is physically separate from the power control module.

DETAILED DESCRIPTION

Figure 1:
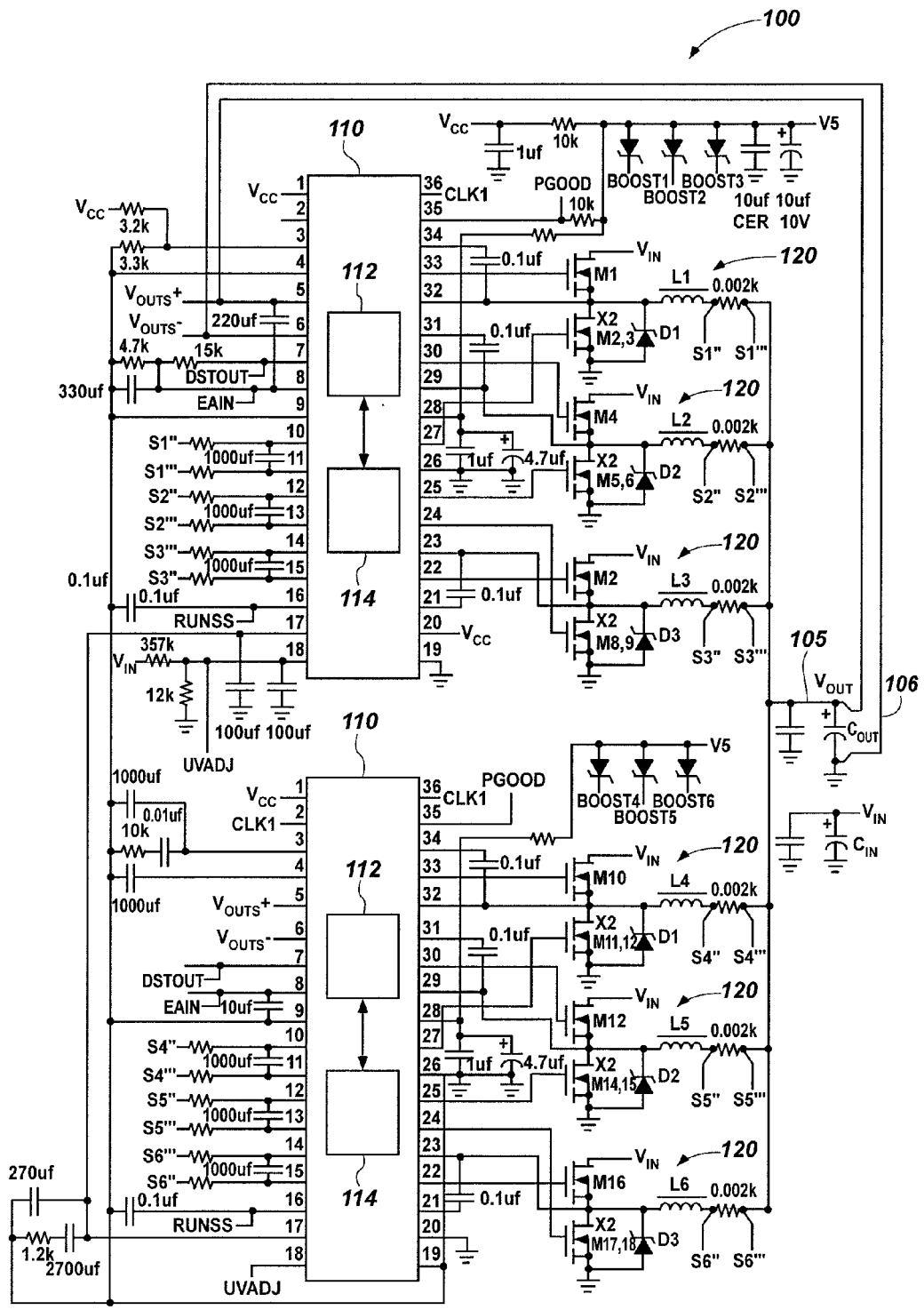
FIG. 1 is a schematic diagram of a conventional power control system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

The design of an electronic device may contribute to the adjustment of the power requirements from a power control system. Such changes usually result in the demand for increased power densities, which may further result in a re-design of one or more of the components of the power control system. These changes affecting the power requirements of the electronic device may occur late in the design process, which may add expense and delays to the design of the power control system. In addition, as conventional power control systems include power control modules and timing control modules that are co-located, the inventors have appreciated that such may contribute to an increasing problem of "hot spots" in the power control system. In addition, referring again briefly to FIG. 1, when conventional power control systems 100 include a plurality of switching converters 120, each of the switching converters 120 may include timing signals from different of pins of the PWM controller 110. Similarly, for current mode regulators each of the switching converters 120 may transmit current sense feedback signals to different of pins of the PWM controller 110. Thus, increasing the number of power stages may contribute significantly to increasing the number of pins required by the PWM controller 110. As a result, a relatively large number of power stages may not be practical given size constraints of the PWM controller 110.

Embodiments of the present disclosure may include power control systems that include physical separation of the power control module and the timing control module. Such separation may contribute to reducing the effects of hot spots by distributing the heat load at locations throughout the physical system. Embodiments of the present disclosure may further allow changes in the design process to be relatively easier by moving the generation of the timing signals to the separate chips associated with the power stages, such that the additional power stages may simply be added or subtracted based on the power requirements without having to reconfigure the entire power control loop. In addition, embodiments of the present disclosure may reduce the number of package pins (e.g., digital pins and analog pins) from the regulating power control loop package in comparison to conventional power control systems. Reducing the number of package pins may result in a smaller package and also contribute to the reduction of undesirable interference to certain sensitive analog signals.

Figure 2:
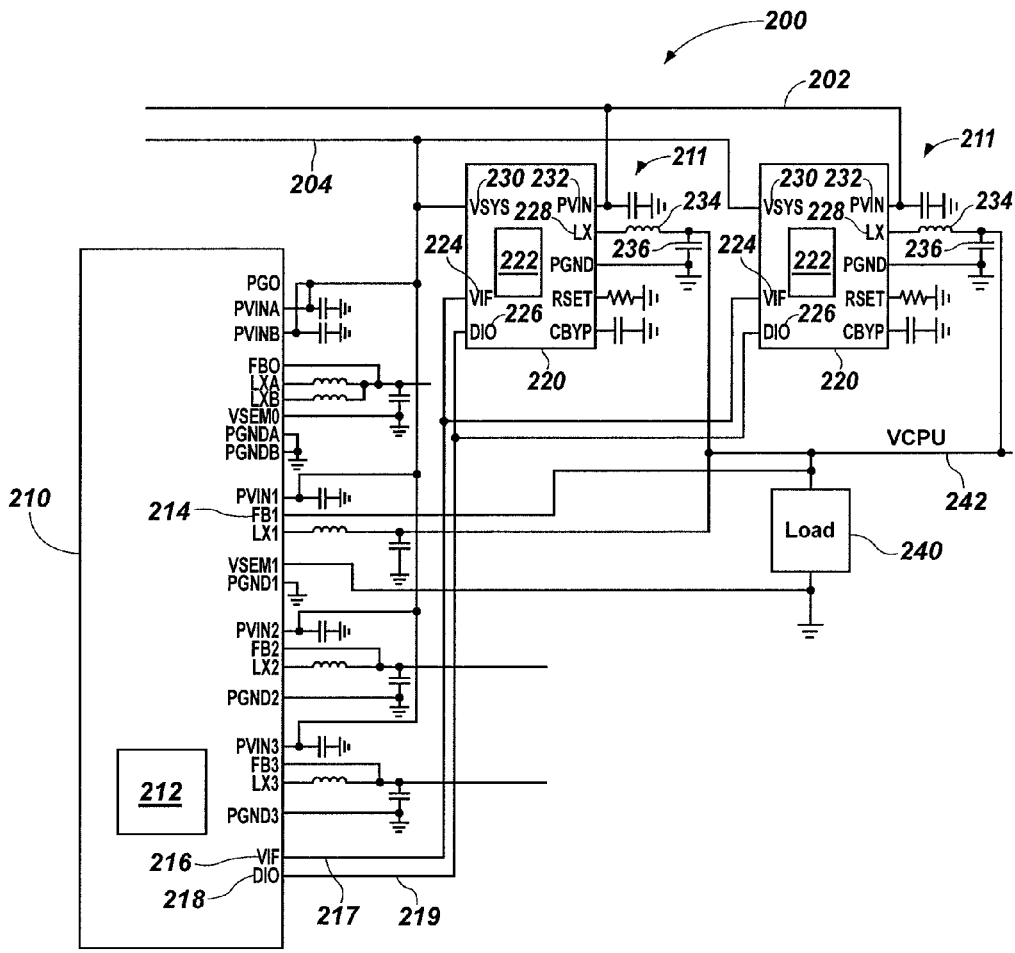
FIG. 2 is a schematic block diagram of a power control system according to an embodiment of the present disclosure.

FIG. 2 is a schematic block diagram of a power control system 200 according to an embodiment of the present disclosure. The power control system 200 includes a power control chip 210 operably coupled with one or more power stages 211. The power control system 200 may be configured to generate an output voltage 242 to be regulated to a desired voltage (e.g., 1V, 2V, etc.) according to the voltage requirements of a load 240. The load 240 may be a device, system, or sub-system of an electronic system. For example, the output voltage 242 may be a power supply for a microprocessor. Thus, the output voltage 242 is also designated in FIG. 2 as "VCPU." In some embodiments, the load 240 and the output voltage 242 may be for a different device, system, or sub-system of an electronic system.

The output voltage 242 may be set by the power control system 200 to a particular desired voltage regardless of the current drawn by the load 240. For example, the power stages 211 may be controlled to supply a current to the load 240 while the voltage may remain the same. Thus, a number of power stages 211 may be provided to achieve a particular current for the load, according to the power requirements of the load 240. In FIG. 2, two power stages 211 are shown; however, it should be appreciated that any number of power stages 211 may be operably coupled with the power control chip 210.

Each power stage 211 may include a timing control chip 220 for controlling the operation of a switching converter. The switching converter may include components such as an inductor 234 and a capacitor 236 that are coupled with one or more switches (not shown) and configured as a voltage converter. Such components configured as a voltage converter may be configured as part of switching regulator (e.g., a current mode regulator, voltage mode regulator). For example, the components may be configured as one of a buck converter, a boost converter, a buck-boost converter, etc. depending on the desired effect. Other types of converters, regulators, and other configurations are also contemplated for which the timing signals may be generated. In addition, as shown in FIG. 2, the power stages 211 may be configured as a voltage controlled current source (VCCS). However, other embodiments may include power stages 211 that are configured as a current controlled current source (CCCS), a voltage controlled voltage source (VCVS) or a current controlled voltage source (CCVS).

In this embodiment shown in FIG. 2, the one or more switches of the power stage 211 may be integrated within the same package of the timing control chip 220. Other components of the power stage 211 may also be integrated within the timing control chip 220. As will be discussed with respect to FIG. 3, the one or more switches of the power stage 211 may be external to the package of the timing control chip 220.

Referring again specifically to FIG. 2, the power control chip 210 includes a power control module 212 configured to perform the power control loop function of the power control system 200. The power control module 212 may receive the output voltage 242 that is to be regulated to a desired voltage. Thus, the output voltage 242 may also have a feedback path to the power control chip 210 and be received at a feedback pin (also labeled "FB") 214. The power control module 212 may receive the output voltage 242 and compare the output voltage 242 (or at least another voltage derived from or dependent on the output voltage 242) with a reference voltage to determine power stage control information. The power stage control information may be represented as a power stage control signal 217 (e.g., voltage) that indicates an offset (if any) between the output voltage 242 and a desired voltage for the output voltage 242. The power stage control signal 217 may be transmitted to an external component through a pin 216 (also labeled "VIF") of the power control chip 210. Additional detail regarding the power stage control signal 217 will be described below. The power control chip 210 may include additional pins having additional functionality that may be contribute to the operation of the electronic system, but which may not be as pertinent as the power control and timing features of the power control system 200.

The timing control chip 220 includes a timing control module 222 configured to generate the timing control signals for control of the power stage 211. The timing control chip 220 may receive the power stage control signal 217 from the power control chip 210 through a pin 224 (also labeled "VIF"). The timing control module 222 of the timing control chip 220 may include control logic (e.g., through hardware, software, etc.) that is configured to generate the timing signals responsive to the received power stage control signal 217. The timing signals may be control signals transmitted to one or more switches (not shown), such that the duty cycle of the timing signals is determined (i.e., based at least in part) by the received power stage control signal 217. In FIG. 2 the one or more switches are not shown as they are assumed to be integrated within the package of the timing control chip 220. The output from the one or more switches may be transmitted externally from the timing control chip 220 through a pin 228 (also labeled "LX"), which may be received by the other components of the voltage converter (e.g., inductor 234, capacitor 236) of the power stage 211 to generate the regulated output voltage 242. The timing control chip 220 may include additional pins having additional functionality that may be contribute to the operation of the electronic system, but which may not be as pertinent the power control and timing features of the power control system 200. For example, power input pins 230 (also labeled "VSYS"), 232 (also labeled "PVIN") may receive a system voltage 204 and a battery voltage 202, respectively.

As discussed above, the power control chip 210 and the timing control chip 220 are physically separate from each other. In other words, the power control module 212 and the timing control module 222 are not co-located with each other. As described above, co-location is defined as being either on the same silicon die and/or located within the same package. Therefore, in contrast to conventional power control systems, the power control module 212 and the timing control module 222 are physically separate from each other. By having the power control module 212 and the timing control module 222 physically separated, the timing control module 222 may be moved to different locations of an electronic system. In addition, a power control system 200 that has a plurality of power stages may include timing control chips 220 (each having a timing control module 222) that are distributed and mounted at various locations on a printed circuit board (PCB) (e.g., motherboard) that are physically separated from the power control chip 210 (having the power control module 212).

By being described as physically separated from each other, it is not to be implied that a particular distance between the power control module 212 and the timing control module 222 is required. For example, in some embodiments the power control module 212 and the timing control module 222 may have a relatively small distance therebetween (e.g., less than an inch). In some embodiments, the power control module 212 and the timing control module 222 may have a relatively large distance therebetween (e.g., 10 inches). As a result, the effect of hot spots may be reduced as the power control chip 210 and the timing control chip 220 are mounted at different locations on a printed circuit board (e.g., motherboard).

As discussed briefly above, the power control system 200 may include any number of power stages 211. For example, some embodiments of the present disclosure may include a single power stage 211, while other embodiments may include a plurality of power stages 211. The plurality of power stages 211 may be coupled in parallel with each other as remote distributed devices. The number of power stages 211 may not affect the output voltage 242; however, having a plurality of power stages 211 may increase the overall power by increasing the current. Thus, the overall power requirement of the load 240 may guide the number of power stages 211 included in the design of the power control system 200.

The power stage control signal 217 may be an analog signal. In some embodiments, the power stage control signal 217 may be converted to a digital signal with an analog to digital controller (ADC) to be transmitted in the digital domain to the timing control module 222. The power stage control signal 217 may be a common signal received by each the timing control chip 220 for each power stage 211 of the power control system 200. In response to each of the timing control chips 220 receiving the power stage control signal 217, the timing control module 222 may generate the appropriate timing signals for regulating the output voltage 242. Because the power stages 211 generate their own timing signals, in contrast to conventional power control systems, the number of pins needed by the power control chip 210 may be reduced. For example, a single pin 216 may send a single power stage control signal 217 that is common to each of the power stages 211 as opposed to having multiple pins dedicated to transmitting different timing signals for different power stages. As a result, the size of the power control chip 210 may be reduced.

In addition, by locating the timing control module 222 within the power stage 211, local current sense feedback signals of the power stage 211 may also not be required to be fed back to the power control chip 210. As discussed above, such local current sense feedback signals may be sensed for the operation of a current mode voltage regulator. As a result, the pins (e.g., pins labeled 10 through 15 in FIG. 1) of conventional power control systems that are associated with the current sense feedback signals may be eliminated from the power control chip. Referring again to FIG. 2, such local current sense feedback signals are not shown, but may be measured internally to the timing control chip 220. As a result, the size of the power control chip 210 may be further reduced, in addition to simplifying the routing of wires between the power control chip 210 and the power stages 211, particularly for systems that include a relatively large number of power stages 211.

In some embodiments, the power stage control signal 217 may also be a modulated signal. For example, the power stage control signal 217 may be modulated (e.g., amplitude modulation, frequency modulate, phase modulation, etc.). Such modulation may result in the power stage control signal 217 having an improved noise immunity. For example, as the power stage control signal 217 may be a direct analog signal, transmitting such a signal over a PCB with many high speed switching nodes may result in unwanted interference onto the power stage control signal 217. Modulating the power stage control signal 217 may limit interference to a particular band, which may result in an improved noise immunity and permit even further distances between the power control chip 210 and the timing control chip 220.

In addition, modulation of the power stage control signal 217 may enable additional information to be transmitted along with the power stage control information. For example, clock synchronization information may be embedded with the power stage control information. In other words, a plurality of different information types (e.g., power stage control information, synchronization information) may be transmitted together through the same pin 216. As a result, additional information may be transmitted without adding an additional pin to both the package of the power control chip 210 and the timing control chip 220. Clock synchronization may include clock information for a master clock. Thus, when the timing control module 222 receives the power stage control signal 217 to determine its own timing control signals for its power stage 211, switching the switches on and off may occur according to a switching frequency and/or duty cycle, and also in a manner that is synchronized to the master clock. As a result, the timing signals for each of the power stages 211 may be synchronized to the master clock. The synchronization information may also be used by a plurality of power stages 211 to synchronize their timing signals with the master clock in the sense that a certain phase offset may be maintained relative each other, with the phase offset still being governed by the master clock.

The power control chip 210 may further be configured to communicate with the timing control chip 220 via an auto-configuration signal 219. Thus, each of the power control chip 210 and the timing control chip 220 may send or receive the auto-configuration signal 219 depending on the direction of communication at the time. For example, the auto-configuration signal 219 may be communicated between a pin 218 (also labeled "DIO") of the power control chip 210 and a pin 226 (also labeled "DIO") of the timing control chip 220. The auto-configuration signal 219 may be a digital signal, with the connection between the DIO pins 218, 226 being a digital channel (e.g., a single wire). The auto-configuration signal 219 may include configuration information between the power control chip 210 and the timing control chip 220 during operation. For example, configuration information may include fault information indicating a fault condition of the power control system 200. A fault condition may include the connection between the VIF pins 216, 224 carrying the power stage control signal 217 may be shorted. Thus, if either of the power control chip 210 or the timing control chip 220 detects a short, a remedial action may be taken, such as ceasing power generation. The configuration information may also include power stage information indicating the presence of individual power stages 211 coupled with the power control chip 210. For example, the power control chip 210 may automatically receive configuration information during start up and determine the number of power stages 211 that are in the power control system 200. As a result, if last minute changes in the design of the load 240 results in a different power requirement (either more or less), the number of power stages 211 may be added or subtracted to the design with little to no reconfiguration (e.g., redesign, reprogramming, etc.) of the power control chip 210. Configuration information may also include additional information, such as voltage or current thresholds and other information that may be used to alter system behavior (e.g., set current limits, gain settings, etc.), device IDs, number of power stages, etc.

Figure 3:
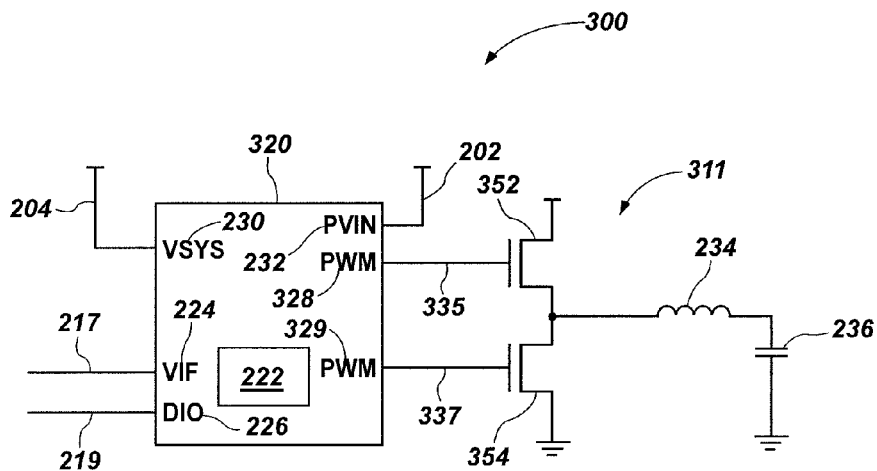
FIG. 3 is a schematic diagram of a portion of a power control system according to an embodiment of the present disclosure.

FIG. 3 is a schematic diagram of a portion of a power control system 300 according to an embodiment of the present disclosure. In particular, FIG. 3 shows a power stage 311 of the power control system 300. The power stage 311 may be one of a plurality of power stages that are coupled to a power control chip, which is not shown in FIG. 3, but may be configured similarly as the power control chip 210 of FIG. 2. As shown in FIG. 3, the power stage 311 may include a timing control chip 320. The timing control chip 320 may include a timing control module 222 that is configured substantially similar to that described above. For example, the timing control module 222 may receive the power stage control signal 217 and generate timing signals 335, 337 in response thereto. In contrast with FIG. 2, the one or more switches 352, 354 may be separate from the timing control chip 320. For example, the switches 352, 354 may be discrete transistors coupled with the inductor 234 and capacitor 236 to operate as a voltage converter. Thus, the timing control chip 320 may be configured as a gate driver for the switches 352, 354. The timing signals 335, 337 may be PWM signals transmitted to the switches 352, 354 through pins 328, 329 (also labeled "PWM").

Figure 4:
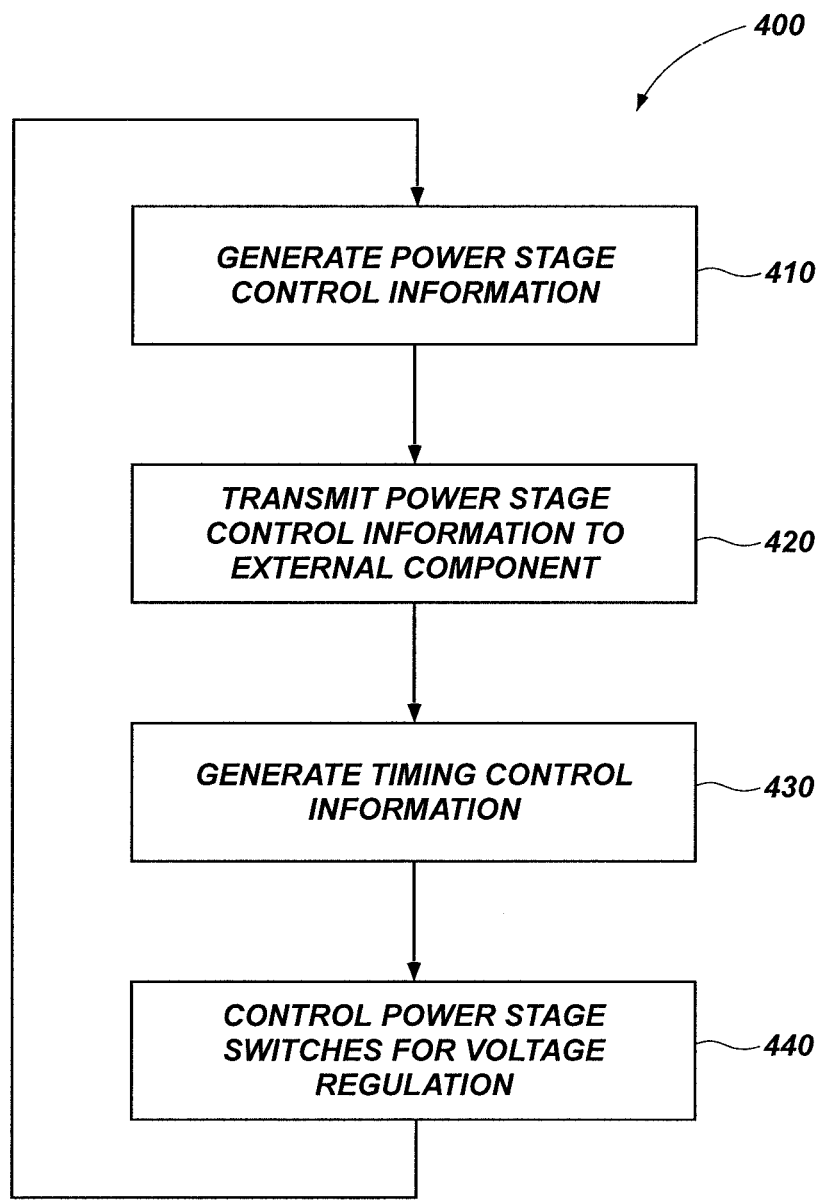
FIG. 4 is a flow chart illustrating a method for power control of a power control system according to an embodiment of the present disclosure.

FIG. 4 is a flow chart 400 illustrating a method for power control of a power control system according to an embodiment of the present disclosure. At operation 410, power stage control information may be generated. For example, a feedback signal from an output voltage may be received by a power control chip and compared with a reference voltage. The power stage control information may indicate an offset (if any) between the output voltage and a desired voltage for the output voltage.

At operation 420, the power stage control information may be transmitted to an external component of the power control system. For example, the power stage control information may be transmitted as a power stage control signal to a timing control chip of a power stage of the power control system. The power stage control signal may be an analog signal, and may further be modulated to improve noise immunity and/or to include additional information for the power stage. For example, the power stage control signal may be modulated to include synchronization information to operate the power stages according to a master clock.

At operation 430, timing control information may be generated responsive to the power stage control information, such as within a timing control module of the timing control chip. The timing control module may be physically separate from a power control module of the power control chip that generates the power stage control information. The timing control information may indicate a duty cycle for one or more power stage switches.

At operation 440, the power stage switches may be controlled according to timing signals generated according to the timing control information to achieve voltage regulation of the output voltage to have a desired voltage. Such an output voltage may be provided to a load, such as a microprocessor, or other device, system, or sub-system of an electronic system. The output voltage may be fed back to the power control chip as a closed loop for adjusting and maintaining the output voltage at the desired level.

Figure 5:
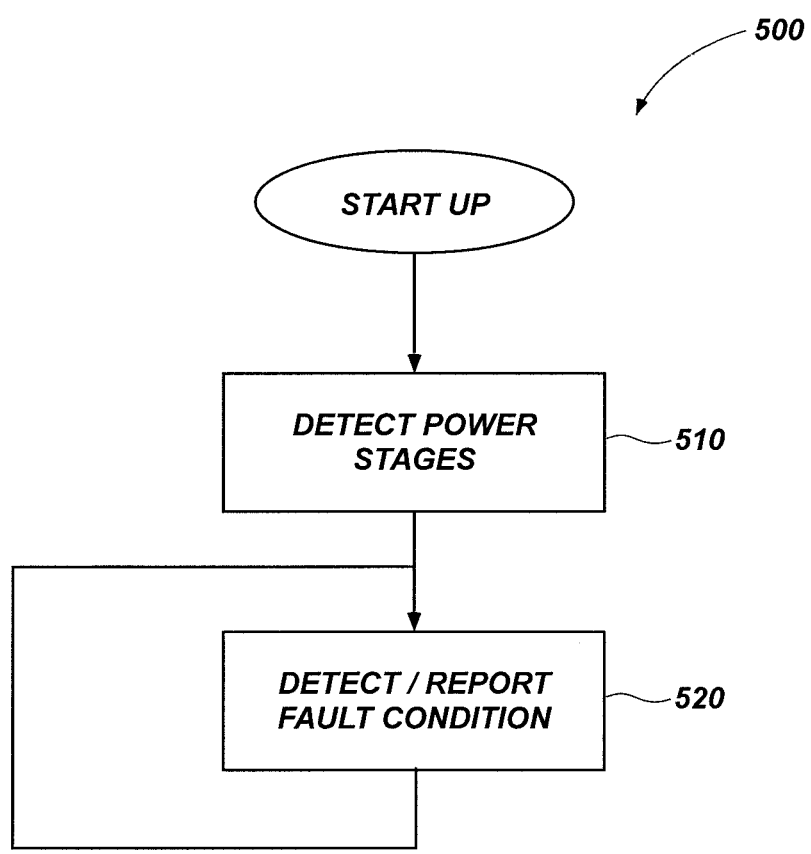
FIG. 5 is a flow chart illustrating a method for auto-configuration of a power control system according to an embodiment of the present disclosure.

FIG. 5 is a flow chart 500 illustrating a method for auto-configuration of a power control system according to an embodiment of the present disclosure. At operation 510, upon start up, the power control chip may detect a number of power stages of the power control system coupled to the power control chip. With such information regarding the number, status, and configuration of the power stages, the power control chip may adjust the operation of the power control module in generating power stage control information and the requirements for transmitting the power stage control signal to the different power stages. At operation 520, fault conditions may be monitored, detected, and reported between the power control chip and a timing control chip of the power stages.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A power control device, comprising:
   a power control chip, including:
      a power control module configured to:
         generate a power stage control signal indicating an offset between an output voltage and a reference voltage;
         externally transmit the power stage control signal to an external power stage having a timing control module that is physically separate from the power control module and external to the power control chip, the power stage control signal being a non-PWM signal that is sufficient for use by the timing control module to determine a duty cycle of PWM timing signals driving the external power stage; and
         modulate the power stage control signal to include power stage control information and clock synchronization information within a single signal, wherein the power stage control information is used by the timing control module to determine the duty cycle of the PWM timing signals, and the clock synchronization information is used by the external power stage to operate according to a master clock; and
      an output pin through which the power stage control signal is transmitted.

2. The power control device of claim 1, wherein the power control module is configured to modulate the power stage control signal according to at least one of an amplitude modulation, a frequency modulation, and a phase modulation scheme.

3. The power control device of claim 1, further comprising:
   a voltage converter; and
   the timing control module configured to receive the power stage control signal and generate a timing control signal to control a duty cycle for driving the voltage converter.

4. The power control device of claim 1, wherein the power stage control signal is transmitted as an analog signal to the external power stage.

5. The power control device of claim 1, wherein the power stage control signal is transmitted as a digital signal to the external power stage.

6. A power control device, comprising:
   a timing control module configured to receive an externally generated power stage control signal that is a non-PWM signal having power stage control information and clock synchronization information within a single signal from a power stage control module that is physically separate from the timing control module, and to generate a PWM timing signal having a duty cycle for driving a voltage converter responsive to the power stage control signal, the PWM timing signal synchronized with a master clock used to generate the clock synchronization information.

7. The power control device of claim 6, further comprising the voltage converter including at least one switch to receive the PWM timing signal.

8. The power control device of claim 7, further comprising a timing control chip package housing the PWM timing module.

9. The power control device of claim 8, wherein the timing control chip package houses the at least one switch.

10. The power control device of claim 7, wherein the voltage converter is configured as a switching converter selected from a group consisting of a buck converter, a boost converter, and a buck-boost converter.

11. The power control device of claim 7, wherein the voltage converter is configured as a controlled current source selected from a group consisting of a voltage controlled current source, a current controlled current source, a voltage controlled voltage source, and a current controlled voltage source.

12. A power control system, comprising:
a power control chip having a power control module configured to:
generate a power stage control signal as a non-PWM signal that is sufficient for use by a timing control module to determine a duty cycle of PWM timing signals driving an external power stage; and
generate an auto-configuration signal having auto-configuration information includes selected from the group consisting of a number of power stages of the power control system, a device ID for the timing control chips, current limit information, and gain settings information; and
a plurality of power stages operably coupled with the power control chip such that each power stage receives the power stage control signal as a first common signal and the auto-configuration signal as a second common signal in parallel with each other, each power stage having a timing control module that is not co-located with the power control module; and
wherein the timing control module of each power stage is configured to:
generate its own timing control signal controlling at least one switch to regulate an output voltage of the at least one power stage responsive to the externally generated power stage control signal; and respond to the auto-configuration signal.

13. The power control system of claim 12, wherein the power stage control signal is an analog signal.

14. The power control system of claim 12, wherein each power stage of the plurality of power stages includes a timing control chip housing its respective timing control module.

15. The power control system of claim 14, wherein the power control chip and the respective timing control chip for each power stage include an input/output pin configured to communicate auto-configuration information via the auto-configuration signal therebetween.

16. The power control system of claim 15, wherein the auto-configuration information includes information that indicates a fault condition of the power control system.

17. A method of controlling power of a power control system, the method comprising:
generating, in a first module, power stage control information indicating an offset between an output voltage and a desired regulated output voltage;
transmitting the power stage control information and embedded clock synchronization information in a single non-PWM signal to an external second module that is physically separate from the first module; and
generating, in the external second module, PWM timing signals for driving a switching converter to regulate the output voltage, the PWM timing signals having a duty cycle derived from the power stage control information, and are synchronized to the embedded clock synchronization information.

18. A method of auto-configuring a power control system, the method comprising:
communicating auto-configuration information between a power control chip having a power control module with a plurality of timing control chips that each have a timing control module that is physically separate from the power control module, each timing control chip of the plurality of timing control chips receiving the auto-configuration information in parallel with each other, wherein the auto-configuration information includes at least one of the information that indicates a number of power stages of the power control system, a device ID for the timing control chips, current limit information, and gain settings information: and
communicating a power stage control signal with embedded clock synchronization information in a single non-PWM signal between the power control module and the timing control module, and generating PWM timing signals for driving a switching converter to regulate the output voltage in response thereto.

19. The method of claim 18, wherein communicating the auto-configuration information further includes communicating information indicating a fault condition of the power control system.

20. The method of claim 19, further comprising ceasing power generation responsive to detecting the fault condition.

21. The method of claim 19, wherein the fault condition includes a short on a connection transmitting a power stage control signal to the plurality of timing control chips.

22. The method of claim 18, further comprising altering system behavior responsive to the auto-configuration information.

23. The method of claim 22, wherein altering the system behavior includes at least one of setting current limits and setting gain settings.

24. The method of claim 18, wherein communicating the auto-configuration information includes communicating the auto-configuration information over a digital channel.

25. The method of claim 24, wherein the digital channel is a single wire channel coupled to a dedicated pin on each timing control chip of the plurality of timing control chips.

26. The method of claim 24, wherein communicating the auto-configuration information includes a single pin being used for both sending and receiving the auto-configuration information at each timing control chip of the plurality of timing control chips.

* * * * *